United States Patent Office.

MOSES S. HIGBIE, OF SOUTH AMBOY, NEW JERSEY, AND ALBERT W. DOUGHERTY, OF BROOKLYN, NEW YORK.

BITUMEN COMPOUND AND PROCESS OF MAKING THE SAME.

SPECIFICATION forming part of Letters Patent No. 387,358, dated August 7, 1888.

Application filed December 17, 1887. Serial No. 258,211. (Specimens.)

*To all whom it may concern:*

Be it known that we, MOSES S. HIGBIE, of South Amboy, New Jersey, and ALBERT W. DOUGHERTY, of Brooklyn, New York, have invented a new and Improved Process of Hardening Bitumen, of which the following is such a full, clear, and exact description as will enable others skilled in the art to which it most nearly appertains to make and use the same.

Bitumen referred to in this specification is to be distinguished from asphaltum referred to in another application, Serial No. 258,210, filed by us the same day this was filed. We confine the term "bitumen" to the material, which is fluid at the ordinary temperatures, as distinguished from asphaltum, which at ordinary temperatures is a solid.

This process relates to the removal of impurities from bitumen, elastic bitumen, or soft asphaltum and the hardening and toughening thereof; and it consists in mixing the bitumen in a suitable vessel with paraffine-wax and oil and heating the same to a temperature above that of boiling water, and maintaining such temperature and driving off all the volatile or volatilizable impurities.

The bitumen, elastic bitumen, or soft asphaltum which it is the purpose of our process to treat is too soft at the ordinary temperature of the atmosphere and too brittle at a temperature low enough to harden it to make it of any great use in the arts. This material we mix with the residuum from petroleum-refineries, consisting of paraffine-wax and oil, and boil them together in a vessel preferably provided with an agitator until they are thoroughly mingled, the temperature being maintained at a temperature and for a time sufficient to volatilize the water, sulphur, acids, and other volatilizable impurities and drive them off with certain volatilizable portions of the petroleum residuum. The proportions of the bitumen to the pretrolum products we usually make as follows: from fifty to eighty of bitumen to fifty to twenty of petroleum residuum and boil them together until all the steam and other volatile matter is driven out. The proportions and time of boiling differ with various kinds of materials and the uses to which they are to be put. The larger the percentage of paraffine-wax used and the longer the boiling continues the harder and tougher will be the resulting product.

Bitumen treated according to this process is made to have the appearance and all the qualities of good hard asphaltum, and may be used in the arts in like manner.

We have described the residuum of petroleum as one of the ingredients; but we do not wish to limit our invention to that, as any equivalent thereof may be used, as paraffine-wax alone or mixed with mineral oil.

The treatment of asphaltum with paraffine-wax is not claimed in this application, as it is claimed in application Serial No. 258,210.

What we claim as new, and desire to secure by Letters Patent, is—

1. The process herein described of hardening bitumen, consisting in melting it with paraffine-wax and subjecting the same to heat to remove the volatile impurities, as specified.

2. The compound consisting of bitumen and paraffine-wax from which the volatile impurities have been removed, as specified and set forth.

MOSES S. HIGBIE.
ALBERT W. DOUGHERTY.

Witnesses:
JOSEPH J. SULLIVAN,
JOHN E. ELMENDORF.